United States Patent [19]

Baucom et al.

[11] Patent Number: 4,716,534
[45] Date of Patent: Dec. 29, 1987

[54] MICROPROCESSOR BASED LEVEL AND ANGLE FINDER

[76] Inventors: D. Michael Baucom, 9100 Sandburg Ave., Charlotte, N.C. 28213; Sergio V. Gomez, 1713 Lyndhurst Ave., Charlotte, N.C. 28203

[21] Appl. No.: 666,806

[22] Filed: Oct. 31, 1984

[51] Int. Cl.⁴ .......................... G01C 1/00; G01C 9/00
[52] U.S. Cl. .................. 364/559; 33/1 PT; 33/366; 250/231 SE
[58] Field of Search ............... 364/559, 565; 33/1 PT, 33/366, 391, 348.2; 250/231 SE

[56] References Cited

U.S. PATENT DOCUMENTS

| | | | |
|---|---|---|---|
| 3,591,842 | 7/1971 | Seewald | 250/337 |
| 3,689,160 | 9/1972 | Shimulenis et al. | 250/231 SE |
| 4,194,184 | 3/1980 | Hartmann et al. | 250/231 SE |
| 4,263,506 | 4/1981 | Epstein | 250/231 SE |
| 4,467,527 | 8/1984 | North et al. | 33/366 |

FOREIGN PATENT DOCUMENTS 1548558  4/1970  Fed. Rep. of Germany .

Primary Examiner—Felix D. Gruber
Attorney, Agent, or Firm—W. Thad Adams, III

[57] ABSTRACT

An angle finder (10) and level (40) are disclosed. The level (10) and angle (40) have digital displays (17) which provide a visual, numerical representation of the angular alignment of a reference surface in relation to a gravitational vector. Angle finder (10) and level (40) are controlled by a microprocessor (19). A disc enclosure (18) contains a rotatably mounted disc (23) on which is mounted a weight (26). Weight (26) keeps disc (23) in a relatively constant position relative to the gravitational vector. Also mounted in the disc enclosure (18) are photodetectors (27), (28) and (29). Disc (23) contains markings (30) which, in the disclosure of this application, each represent two degrees of arc. The three photodetectors (27), (28) and (29) sense the movement of markings (30) and by logical computation microprocessor (19) determines the angular alignment of the reference surface. In another embodiment of the invention, a disc enclosure (18') includes u-throat detectors (60), (61) and (62) which count the passage of markings (55) on a transparent disc (50) in the manner described above.

13 Claims, 8 Drawing Figures

MICROPROCESSOR BASED LEVEL AND ANGLE FINDER

TECHNICAL FIELD AND BACKGROUND OF THE INVENTION

This invention relates to a level and/or angle finder. For purposes of illustration in this application, two separate but closely related embodiments are disclosed. Except where necessary to distinguish between these two embodiments, the term "angle finder" will be used for convenience.

The angle finder is used to determine any angle when a "leg" is not present which corresponds to the gravitational levelness of the earth. In describing the invention in this application, the term "gravitational vector" will be used to describe a gravitational force in a straight-line direction which would usually correspond to the gravitational pull of the earth but would also include instances where the apparatus is being used in areas of artificial gravity.

Prior art devices relating to this invention include the McInerney U.S. Pat. No. 4,253,242. This patent describes a digital angle indicator which includes a gravity responsive rotor with four arc slots machined through the rotor. The McInerney patent measures the position of a reference surface relative to eight predetermined angles forty-five degrees apart. Photodetectors act as shutters and a hard wired circuit computes the position of the device relative to one of the predetermined eight angles. In the disclosure of the McInerney patent, the user does not know the degree of error but only whether the angular position of the angle indicatorr is greater or less than one of the predetermined angles. McInerney also discloses a number of variations, including the use of a transparent rotor and the use of rotors with varying sized slots to vary the amount of angular deviation which is permitted from a nominal desired position.

However, while the McInerney patent is referred to as a "digital" angle indicator, in fact the term "binary" should be used to refer to the fact that a visual indication shows only whether the surface under inspection has or does not have the desired angular alignment. It does not provide a readout of the actual angle of the surface under inspection.

SUMMARY OF THE INVENTION

Therefore, it is an object of the invention to provide a microprocessor based level and angle finder which gives an exact, digital reading of the angle of a surface relative to a gravitational vector.

It is another object of the present invention to provide an angle finder which is low in cost, quick and easy to operate.

It is another object of the invention to provide an angle finder which is reprogrammable.

These and other objects and advantages of the present invention are achieved in the preferred embodiments disclosed below by providing a housing in which is mounted for rotation an eccentrically weighted disc. Radially extending, discrete markings on the disc each define a positional relationship relative to a gravitational vector. Sensing means are stationarily mounted in the housing and sense the passage of the markings on the disc past a reference point as the disc rotates in relation to the housing and assumes and maintains a position corresponding to the gravitational vector. A microprocessor computes the number and direction of movement of the markings as the disc rotates and the markings move past the sensing means. The angular position of the reference point relative to the gravitational vector is computed and displayed on a digital readout.

Preferably, the discrete markings on the disc comprise spaced-apart lines with each line representing two degrees of arc and each space representing two degrees of arc. The sensing means comprise first and second photodetectors spaced an odd number of degrees of arc apart to sense the spaces and the markings, and a third photodetector positioned at a predetermined angular position from the first and second photodetectors in order to sense gravitational alignment of the disc with reference to a zero degree reference marking on the disc.

According to one embodiment of the invention, the disc is transparent and the markings thereon are opaque. The photodetector comprises a u-throat photodetector having a light transmitter on one side and a light receiver on the opposite side in light receiving relation to the light transmitter whereby light pulses created by the interruption of light transmission through the transparent disc are received by the light receiver and transmitted to a microprocessor for computation.

In another embodiment of the invention, the disc is opaque and the spacings and markings have contrasting reflective characteristics. The photodetector comprises a photoreflective transistor whereby the passage of markings and spaces past the photoreflective transistor create pulses which are transmitted to the microprocessor for computation.

According to the embodiment of the invention disclosed herein, the microprocessor comprises a Read Only Memory, which is preferably electronically programmable. In the method of determining the angular position of a reference point relative to a gravitational vector according to this invention, a disc is provided mounted for rotation relative to the reference point. The disc contains spaced-apart markings thereon concentric to the axis of rotation of the disc and the disc is eccentrically weighted to assume a position corresponding to the gravitational vector. Movement of the marks on the disc past two spaced apart sensors is sensed. The number and direction of the movement of the markings is computed and the angular position of the reference point relative to the gravitational vector is determined. A number corresponding to the angular position of the reference point relative to the gravitational vector is displayed.

Some of the objects of the invention have been set forth above. Other objects and advantages of the invention will appear as the description of the invention proceeds when taken in conjunction with the following in which.

DESCRIPTION OF THE PREFERRED EMBODIMENT

Figure 1:
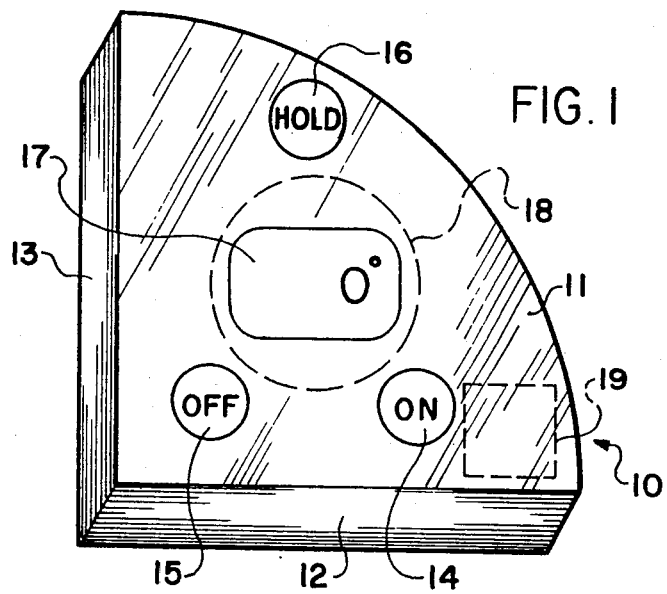
FIG. 1 is a perspective view of an angle finder according to the present invention.

Referring now specifically to the drawings, an angle sensor according to the angle finder embodiment of the invention is shown and broadly indicated at 10. The angle finder 10 is relatively comport and is ideal for measuring vertical and horizontal surfaces, especially in tight spaces. Angle finder 10 includes a housing enclosure 11 having a planar reference surface 12 and an adjacent, perpendicular reference surface 13 thereon. Housing 11 also includes a digital display window which provides a visual, numerical representation of the angular alignment of reference surface 12 or 13 with a gravitational vector. Housing 11 also includes an "on" switch 14, and "off" switch 15, and a "hold" switch 16, the functions of which will be described below. Enclosed within housing 11 is a disc enclosure 18 and a microprocessor 19. The microprocessor 19 may suitably comprise a Motorola MC68705P3 EPROM, Motorola MC6805P2 PROM or Motorola CMOS version 14MC6805G2 PROM.

Figure 2:
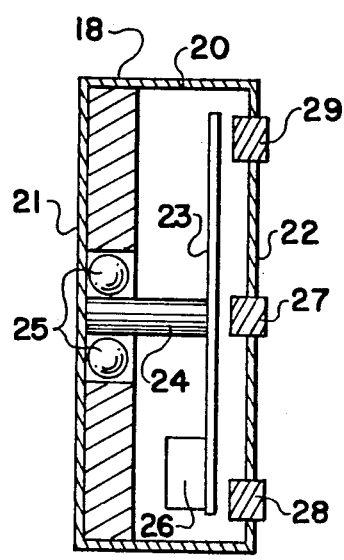
FIG. 2 is a vertical cross-sectional view of the disc enclosure according to the present invention.
Figure 3:
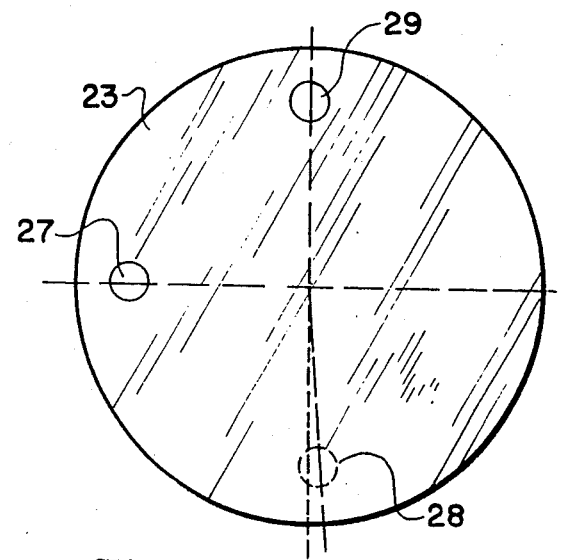
FIG. 3 is an elevational view of the disc enclosure of FIG. 1 showing the position in the enclosure of the photodetectors.

Referring now to FIG. 2, the disc enclosure 18 which is positioned in housing 11 comprises a cylindrical body 20 which is enclosed on opposite ends by disc enclosure covers 21 and 22. A disc 23 is mounted for rotation on an arbor 24. Arbor 24 is mounted into a precision bearing 25, the outer race of which is press fitted into the cylindrical body 20. A weight 26 is eccentrically mounted on disc 23. The eccentricity of weight 26 keeps disc 23 in a relatively constant position relative to a gravitational vector and establishes a reference alignment. Enclosure cover 22 carries three photodetectors 27, 28 and 29. By reference to FIG. 3, the relative position of photodectors 27, 28 and 29 is shown.

Figure 1A:
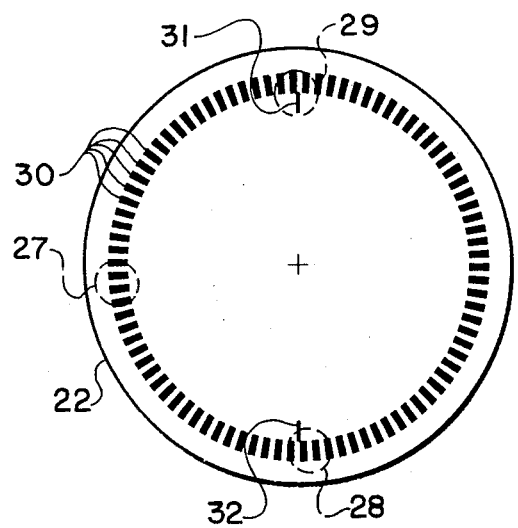
FIG. 1A is a rotatably mounted disc, either opaque or transparent, with suitable degree markings thereon.

Referring now to FIG. 1A, disc 23 has markings 30 marked on its surface near its outer periphery. Each marking 30 represents two degrees of arc and each blank space between each marking 30 also represents two degrees of arc. There are ninety such markings 30 and, together with ninety intermediate spaces provides a total of 360 degrees represented on the disc. In addition, two zero degree reference lines 31 and 32 are also marked on disc 23, but are spaced inwardly from markings 30 and are independently sensed by the photodetectors. Photodetectors 27 and 29 are spaced exactly ninety degrees apart. Photodetectors 27 and 28 are spaced ninety-one degrees apart in this particular embodiment, but can be spaced any odd number of degrees apart according to the formula (N×4)+1 degrees apart where N is any integer between 0° and 89°. Zero degree reference lines 31 and 32 are 180 degrees apart on disc 23.

Figure 4:
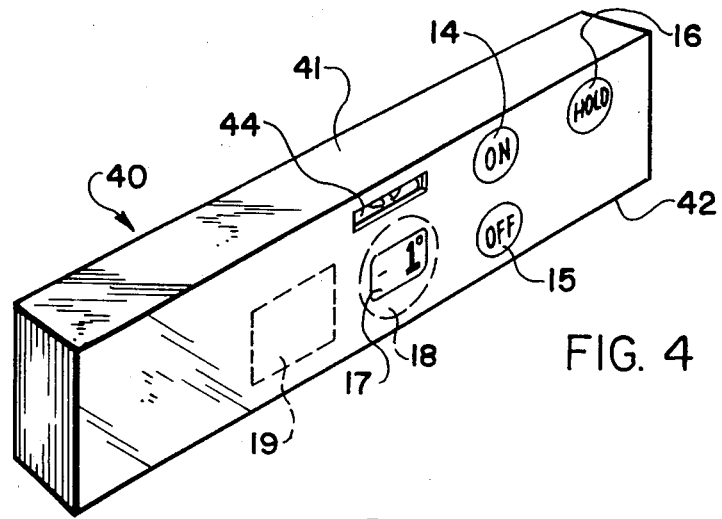
FIG. 4 is a perspective view of a level according to the present invention.

Referring now to FIG. 4, a level according to the invention is indicated at broad reference numeral 40. Level 40 includes a housing 41, the bottom surface of which is a reference surface 42 on which the level 40 is placed in order to obtain a digital readout of the angle of the surface on which reference surface 42 is resting. Level 40 also includes a digital display 17, a microprocessor 19, an "on" switch 14, an "off" switch 15 and a "hold" switch 16, all as described above with reference to angle finder number 10.

In addition, level 40 includes a conventional bubble-type level indicator 44 to provide a purely physical, visual reference in addition to the digital reference provided by display 17. Disc enclosure 18, also described above, is mounted in level 40 and performs the same function with reference to level 40 as with angle finder 10.

Figure 5:
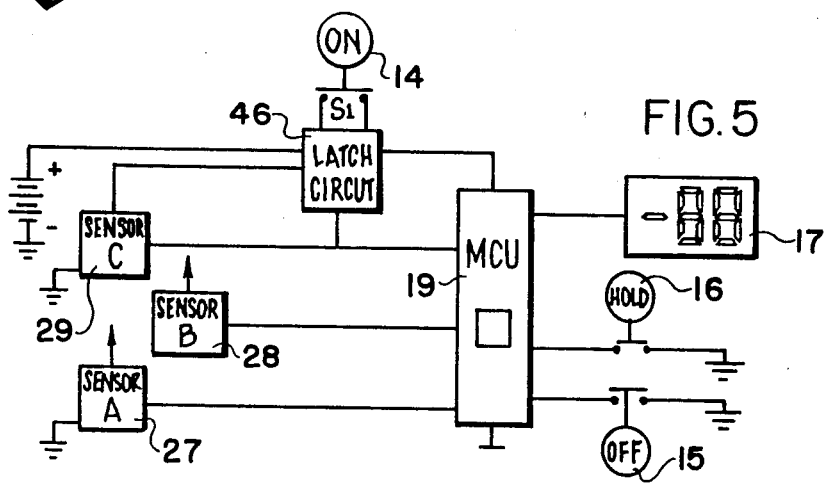
FIG. 5 is a circuit diagram of the angle finder shown in FIG. 1 and the level shown in FIG. 4.

Referring now to FIG. 5 a schematic circuit diagram of the invention, including microprocessor 19, is shown. When the "on" switch 14 is depressed, a latch circuit 46 momentarily connects power from a self-contained battery or other power source 47 and interconnects sensor 29 and microprocessor 19. Microprocessor 19 enters a power-up mode and waits until sensor 29 sends a signal indicating that zero degree reference line 32 has passed sensor 29. Upon reception of this pulse, microprocessor 19 sends a signal to latch circuit 46 causing it to be bypassed, permitting current to flow directly between battery 47 and microprocessor 19. At this time, the "on" switch 14 can be released without causing any change in the operation of level 10.

Microprocessor 19 now is available to receive pulses from photodetectors 27 and 28. Photodetectors 27 and 28 send a pulse for each marking 30 which passes. Since the memory of microprocessor 19 is programmed to cause counting to read the appropriate degree of rotation represented by each such pulse, the microprocessor 19 processes the signals and determines, first, if disc 23 is rotating clockwise or counterclockwise relative to sensors 27 and 28. The angle is then incremented or decremented accordingly. Then, microprocessor 19 generates a signal to the digital display 17 which presents a visual readout of the angular position of disc 23 relative to the respective positions of photodetectors 27, 28 and 29.

If the "hold" switch 16 is depressed, microprocessor 19 continues all of its functions except it fixes the visual display 17 with the angle shown at the time "hold" switch 16 was depressed. Depressing "hold" switch 16 again will resume continuous update and display of the current angle as level 10 is moved.

Microprocessor 19 also includes a timing mechanism which determines the length of time level 10 has been in the same position, i.e., the length of time since a pulse indicating movement of level 10 was received by sensor 27 or 28. If left stationary for five minutes or some other suitable length of time, the microprocessor 19 will send a signal to latch circuit 46 causing it to turn the power off, thereby preventing battery 47 from being drained.

Another feature of the invention is the ability to determine the angle between any two different surfaces. To do this, the "hold" switch 16 is depressed and the angle of the first surface is read on the display 17 in the usual manner. While continuing to depress the "hold" switch 16, the level 10 is placed on the second surface. Then, by releasing the "hold" switch 16 and depressing the "on" switch 15, the angle between the first and second surfaces is displayed. The microprocessor 19 stores the angle reading of the first surface and compares it with the angle reading of the second surface, making the necessary calculation to determine the angle difference between the two.

To terminate operation of level 10, the "off" switch 15 is depressed which disconnects current from battery 47 to all of the operating mechanisms of the circuit, including display 17.

Microprocessor 19 is also programmed to automatically check for proper operation and alignment of sensors 27, 28 and 29. This feature activates automatically at any time any photodetector is misaligned. This sequence instructs microprocessor 19 to display a "—cl" indicating a misalignment of one or more of the photodetectors 27, 28 and 29.

The logic with which photodetectors 27 and 28 read markings 30 is as follows:

plus 1—27 is open. 28 is closed.
plus 2—27 is open. 28 is open.
plus 3—27 is closed. 28 is open.

0—27 is closed. 28 is closed.
minus 1—27 is closed. 28 is open.
minus 2—27 is open. 28 is open.
minus 3—27 is open. 28 is closed.

After each four degrees of change, the sequence repeats itself. In changing the direction of rotation of level 10, microprocessor 19 accepts the photodetector transmissions and processes the information accordingly, transmitting the correct readout to the display. As is apparent, microprocessor not only keeps track of the individual positions of photodetectors 27 and 28 relative to markings 30 but, since photodetectors 27 and 28 are 91 degrees apart, accuracy of the standard unit can be achieved at plus or minus ½ degree. Furthermore, microprocessor 19 counts each increment of plus or minus four degrees and can display it to provide readout of plus or minus 89 degrees.

Figure 7:
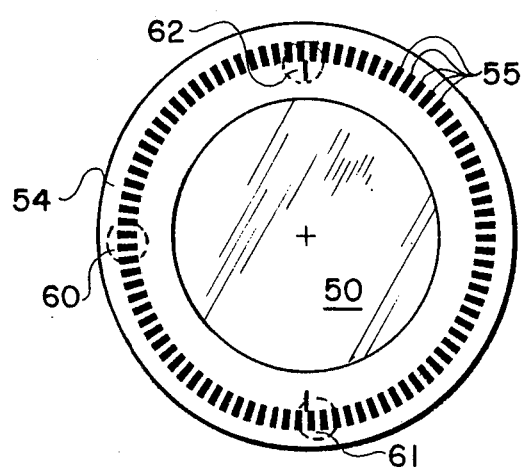
FIG. 7 is a transparent disc mounted in the disc enclosures shown in FIG. 6.
Figure 6:
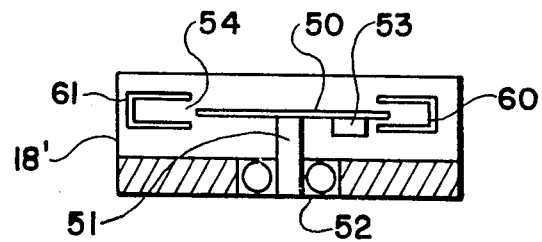
FIG. 6 is a vertical cross-sectional view of a disc enclosure according to another embodiment of the invention making use of u-throat photodetectors.

Referring now to FIGS. 6 and 7, another embodiment of the invention according to this application is illustrated. In FIG. 6, a disc enclosure 18' includes a disc 50 mounted on an arbor 51 for rotation in precision bearings 52, substantially as described above. Disc 50 includes an eccentric weight 53 which, also as described above, maintains disc 50 in alignment with a gravitational vector. A transparent overlay 54, also circular but having a larger circumference than disc 50 is positioned on top of disc 50 concentric therewith. As is shown in FIG. 7, plastic overlay 54 is provided with markings 55 as described above, with each marking defining two degrees of arc and each space between each marking 55 also defining two degrees of arc. Photodetectors 60, 61 and 62 are positioned as described above with reference to disc 23. However, photodetectors 60, 61 and 62 comprise u-throat photodetectors and, as is shown in FIG. 6, transmit a light through the transparent overlay 54 which is received on the other side. Markings 55 are opaque and, as they rotate past u-throat photodetectors 60 and 61, create pulses which are sensed and transmitted to the microprocessor.

Because of the great sensitivity and accuracy of u-throat photodetectors, a high degree of accuracy can be obtained when necessary or desirable. Instead achieving accuracy in the range of plus or minus ½ degree, accuracy in minutes or even seconds can be achieved by providing markings on the transparent overlay 54 having a corresponding increment.

A level and/or angle finder is described above. Various details of the invention may be changed without departing from its scope. Furthermore, the foregoing description of the preferred embodiment of the angle sensor according to the present invention is provided for the purpose of illustration only and not for the purpose of limitation-the invention being defined by the claims.

I claim:

1. An angle sensor comprising:
   a. a housing having a reference point thereon;
   b. gravity responsive means mounted in said housing and including an eccentrically weighted disc mounted for rotation on an axis in said housing, and radially extending discrete markings thereon around the disc concentric with said axis, each of which markings defines a positional relationship relative to a gravitational vector wherein said discrete markings on said disc comprise spaced-apart lines, each line representing two degrees of arc and each space representing two degrees of arc, said sensing means comprising first and second phototransistors spaced an odd number of degrees of arc apart to sense said spaces and said markings, and a third phototransistor positioned at a predetermined angular position from said first and second phototransistors for sensing gravitational alignment of the disc with reference to a zero degree reference marking on said disc;
   c. sensing means stationarily mounted in said housing for sensing the passage of the markings on the disc as the housing moves in relation to said disc and the disc maintains a position corresponding to the gravitational vector;
   d. means for determining the number of and direction of movement of the markings as the markings move past said sensing means, and computing the angular position of the reference point relative to the gravitational vector; and
   e. display means for indicating the angular position of the reference point.

2. An angle sensor according to claim 1, wherein said first phototransistor is angularly positioned 91 degrees of arc from said second phototransistor and 90 degrees of arc from said third phototransistor.

3. An angle sensor according to claim 1, wherein said disc is transparent and said markings are opaque, and said phototransistor comprises a u-throat phototransistor having a light transmitter on one side of said disc and light receiver on the opposite side of said disc in light receiving relation to the light transmitter whereby light pulses created by the interruption of light transmission through said transparent disc by the opaque markings are received by said light receiver and transmitted to said means for determining and computing for computation of angular position.

4. An angle sensor according to claim 1, wherein said disc is opaque, said spaces and said markings having contrasting light reflective characteristics, and wherein said phototransistor comprises a photoreflective transistor whereby the passage of markings and spaces on said disc past the photoreflective transistor creates light pulses which are transmitted to said means for determining and computing for computation of angular position.

5. An angle sensor according to claim 3 or 4 wherein said means for determining and computing comprises a Read Only Memory microprocessor.

6. An angle sensor according to claim 5, wherein said angle sensor comprises a level, wherein the reference point of said level includes a reference surface, said display means comprises a digital display and said microprocessor is programmed to compute a zero degree display if the reference surface is true to the gravitational vector, and a plus or minus degree number display if the reference surface is not true to the gravitational vector.

7. An angle sensor according to claim 5, wherein said angle sensor comprises an angle finder, the housing of said angle finder including perpendicular adjacent reference surfaces, said display means comprises a digital display and said microprocessor is programmed to compute and display reading of from zero degrees to 179 degrees of angular position relative to the gravitational vector.

8. An angle sensor comprising:
   a. a housing having a reference point thereon;
   b. gravity responsive means mounted in said housing and including an eccentrically weighted disc mounted for rotation on an axis in said housing, and a single array of radially extending discrete markings thereon around the disc concentric with said axis, each of which markings defines a positional relationship relative to a gravitational vector;
   c. sensing means stationarily mounted in said housing for sensing the passage of the markings on the disc as the housing moves in relation to said disc and the disc maintains a position corresponding to the gravitational vector, said sensing means comprising first and second phototransistors spaced on or at an odd number of degrees of arc apart from each other to sense said spaces and said markings, and a third phototransistor positioned at a predetermined angular position from said first and second phototransistors for sensing gravitational alignment of the disc with reference to a zero degree reference marking on said disc wherein said first phototransistor is angularly positioned 91 degrees of arc from said second phototransistor and 90 degrees of arc from said third phototransistor;
   d. means for counting the number and determining the direction of movement of the markings as the markings move past said sensing means, and computing the angular position of the reference point relative to the gravitational vector; and
   e. display means for indicating the angular position of the reference point.

9. An angle sensor according to claim 8, wherein said disc is transparent and said markings are opaque, and said first and second phototransistors each comprise u-throat phototransistors having a light transmitter on one side of said disc and light receiver on the opposite side of said disc in light receiving relation to the light transmitter whereby light pulses created by the interruption of light transmission through said transparent disc by the opaque markings are received by said light receiver and transmitted to said means for counting the number and determining the direction of movement of the markings for computation of angular position.

10. An angle sensor according to claim 8, wherein said disc is opaque, said spaces and said markings having contrasting light reflective characteristics, and wherein said phototransistor comprises a photoreflective transistor whereby the passage of markings and spaces on said disc past the photoreflective transistor creates light pulses which are transmitted to said means for counting the number and determining the direction of movement of the markings for computation of angular position.

11. An angle sensor according to claim 8 or 10, wherein said means for counting the number and determining the direction of movement of the markings comprises a Read Only Memory microprocessor.

12. An angle sensor according to claim 11, wherein said angle sensor comprises a level, wherein the reference point of said level includes a reference surface, said display means comprises a digital display and said microprocessor operates to compute a zero degree display if the reference surface is true to the gravitational vector, and a plus or minus degree number display if the reference surface is not true to the gravitational vector.

13. An angle sensor according to claim 12, wherein said angle sensor comprises an angle finder, the housing of said angle finder including perpendicular adjacent reference surfaces, said display means comprises a digital display and said microprocessor is programmed to compute and display reading of from zero degrees to 179 degrees of angular position relative to the gravitational vector.

* * * * *